(12) United States Patent
Seitz et al.

(10) Patent No.: US 6,363,170 B1
(45) Date of Patent: Mar. 26, 2002

(54) PHOTOREALISTIC SCENE RECONSTRUCTION BY VOXEL COLORING

(75) Inventors: Steven M. Seitz, Madison, WI (US); Charles R. Dyer, Eugene, OR (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 09/302,704

(22) Filed: Apr. 29, 1999

Related U.S. Application Data

(60) Provisional application No. 60/083,824, filed on Apr. 30, 1998.

(51) Int. Cl.[7] ............................................... G06K 9/00
(52) U.S. Cl. ....................................... 382/154; 345/424
(58) Field of Search ................................. 382/100, 131, 382/154, 284; 345/419, 424, 427

(56) References Cited

U.S. PATENT DOCUMENTS 5,756,354 A * 5/1998 Tzidon et al. .............. 345/424
5,963,211 A * 10/1999 Oikawa et al. ............. 345/424

OTHER PUBLICATIONS

Plenoptic image editing, by Seitz et al.*
A space sweep approach to true multi image matching, by Collins, IEEE, 1996.*
S. Kawato, "Structure Recovery from Multiple Images by Directly Estimating the Intersections in 3–D Space," IEICE Trans. Inf. & Syst., Sep. 1994 E77–D:966–972.

A. Katayama, et al., "A Viewpoint Dependent Stereoscopic Display Using Interpolation of Multi–Viewpoint Images," Proceedings of The Society of Photo–Optical Instrumentation Engineers, 2409:11–20, Feb. 7–9, 1995.

S. Moezzi, et al., "Immersive Video," Proceedings of the IEEE 1996 Virtual Reality Annual International Symposium, 3/30–Apr. 3, 1996, 17–24.

S. Seitz, et al., "Plenoptic Image Editing," Univ. of Rochester, Computer Science, Technical Report 647 Jan. 1997, pp. 5–6.

S. Seitz, et al., "Photorealistic Scene Reconstruction by Voxel Coloring," Proc. Image Understanding Workshop, May, 1997.

* cited by examiner

*Primary Examiner*—Joseph Mancuso
*Assistant Examiner*—Vikkram Bali
(74) *Attorney, Agent, or Firm*—Quarles & Brady LLP

(57) ABSTRACT

A novel scene reconstruction technique is presented, different from previous approaches in its ability to cope with large changes in visibility and its modeling of intrinsic scene color and texture information. The method avoids image correspondence problems by working in a discretized scene space whose voxels are traversed in a fixed visibility ordering. This strategy takes full account of occlusions and allows the input cameras to be far apart and widely distributed about the environment. The algorithm identifies a special set of invariant voxels which together form a spatial and photometric reconstruction of the scene, fully consistent with the input images.

1 Claim, 2 Drawing Sheets

PHOTOREALISTIC SCENE RECONSTRUCTION BY VOXEL COLORING

CROSS-REFERENCE TO RELATED APPLICATION

This application claims the benefit of U.S. provisional filing No. 60/083,824, filed Apr. 30, 1998, hereby incorporated by reference.

STATEMENT REGARDING FEDERALLY SPONSORED RESEARCH OR DEVELOPMENT

This invention was made with United States government support awarded by the following agencies: DARPA Grant No. F30602-97-1-0138 and NSF Grant Nos. IRI-9530985; IRI-9220782; and INT-9300146. The United States has certain rights in this invention.

BACKGROUND OF THE INVENTION

We consider the problem of acquiring photo-realistic 3D models of real environments from widely distributed viewpoints. This problem has sparked recent interest in the computer vision community [Kanade et al., 1995, Moezzi et al., 1996, Beardsley et al., 1996, Leymarie et al., 1996] as a result of new applications in telepresence, virtual walkthroughs, automatic 3D model construction, and other problems that require realistic textured object models.

We use the term photorealism to refer to 3D reconstructions of real scenes whose reprojections contain sufficient color and texture information to accurately reproduce images of the scene from a wide range of target viewpoints. To ensure accurate reprojections, the input images should be representative, i.e., distributed throughout the target range of viewpoints. Accordingly, we propose two criteria that a photorealistic reconstruction technique should satisfy:

Photo Integrity: The reprojected model should accurately reproduce the color and texture of the input images.

Broad Coverage: The input images should be widely distributed throughout the environment, enabling a wide coverage of scene surfaces.

Instead of using existing stereo and structure-from-motion methods to solve this problem, we choose to approach it from first principles. We are motivated by the fact that current reconstruction techniques were not designed with these objectives in mind and, as we will argue, do not fully meet these requirements. Driven by the belief that photo integrity has more to do with color than shape, we formulate a color reconstruction problem, in which the goal is an assignment of colors (radiances) to points in an (unknown) approximately Lambertian scene. It is shown that certain points have an invariant coloring, constant across all possible interpretations of the scene, consistent with the input images. This leads to a volumetric voxel coloring method that labels the invariant scene voxels based on their projected correlation with the input images. By traversing the voxels in a special order it is possible to fully account for occlusions—a major advantage of this scene-based approach. The result is a complete 3D scene reconstruction, built to maximize photo integrity.

The photorealistic scene reconstruction problem, as presently formulated, raises a number of unique challenges that push the limits of existing techniques. First, the reconstructions must be dense and sufficiently accurate to reproduce the original images. This requirement poses a problem for feature-based reconstruction methods, which product relatively sparse reconstructions. Although sparse reconstructions can be augmented by fitting surfaces (e.g., [Beardsley et al., 1996]), the triangulation techniques currently used cannot easily cope with discontinuities and, more importantly, are not image driven. Consequently, surfaces derived from sparse reconstructions may only agree with the input images at points where image features were detected.

Contour-based methods (e.g., [Cipolla and Blake, 1992, Szeliski, 1993, Seales and Faugeras, 1995]) are attractive in their ability to cope with changes in visibility, but do not produce sufficiently accurate depth-maps due to problems with concavities and lack of parallax information. A purely contour-based reconstruction can be texture-mapped, as in [Moezzi et al., 1996], but not in a way that ensures projected consistency with all of the input images, due to the aforementioned problems. In addition, contour-based methods require occluding contours to be isolated; a difficult segmentation problem avoided by voxel coloring.

The second objective requires that the input views be scattered over a wide area and therefore exhibit large scale changes in visibility (i.e., occlusions, changing field of view). While some stereo methods can cope with limited occlusions, visibility changes of much greater magnitude appear to be beyond the state of the art. In addition, the views may be far apart, making the correspondence problem extremely difficult. Existing stereo-based approaches to this problem [Kanade et al., 1995] match nearby images two or three at a time to ameliorate visibility problems. This approach, however, does not fully integrate the image information and introduces new complications, such as how to merge the partial reconstructions.

The voxel coloring algorithm presented here works by discretizing scene space into a set of voxels that are traversed and colored in a special order. In this respect, the method is similar to Collins' Space-Sweep approach [Collins, 1996], which performs an analogous scene traversal. However, the Space-Sweep algorithm doe snot provide a solution to the occlusion problem, a primary contribution of this paper. Katayama et al. [Katayama et al., 1995] described a related method in which images are matched by detecting lines through slices of an epipolar volume, noting that occlusions could be explained by labeling lines in order of increasing slope. This ordering is consistent with our results, following from the derivations in Section 2. However, their algorithm used a reference image, thereby ignoring points that are occluded in the reference image but visible elsewhere. Also, their line detection strategy requires that the views all lie on a straight line, a significant limitation. An image-space visibility ordering was described by McMillan and Bishop [McMillan and Bishop, 1995, Kang and Szeliski, 1996] algorithms that avoid field of view problems by matching 360 degree panoramic views directly. Panoramic reconstructions can also be achieved using our approach, but without the need to first build panoramic images (see FIGS. 1(b) and 4).

The remainder of the paper is organized as follows. Section 2 formulates and solves the voxel coloring problem, and describes its relationship to shape reconstruction. Section 3 presents an efficient algorithm for computing the voxel coloring from a set of images. Section 4 describes some experiments on real and synthetic image sequences that demonstrate how the method performs.

Figure 3:
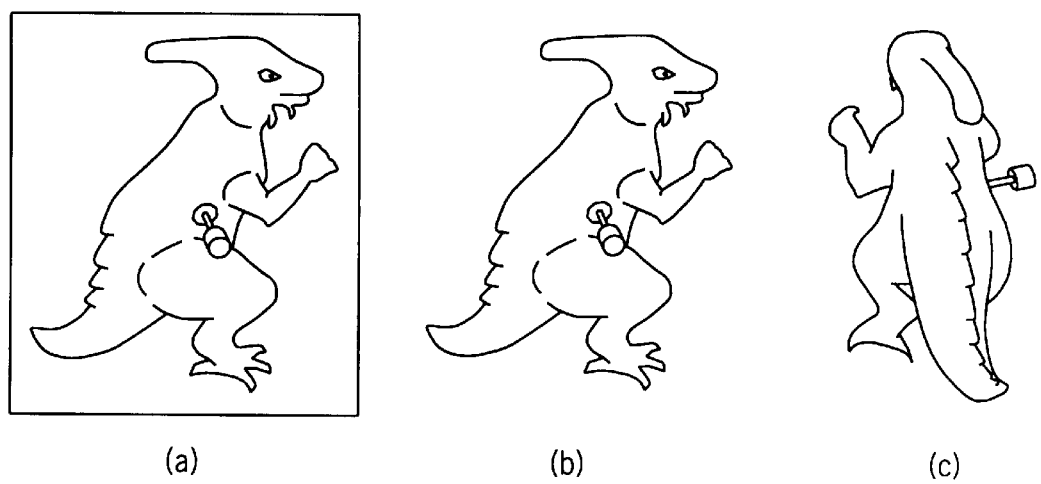
Figure 4:
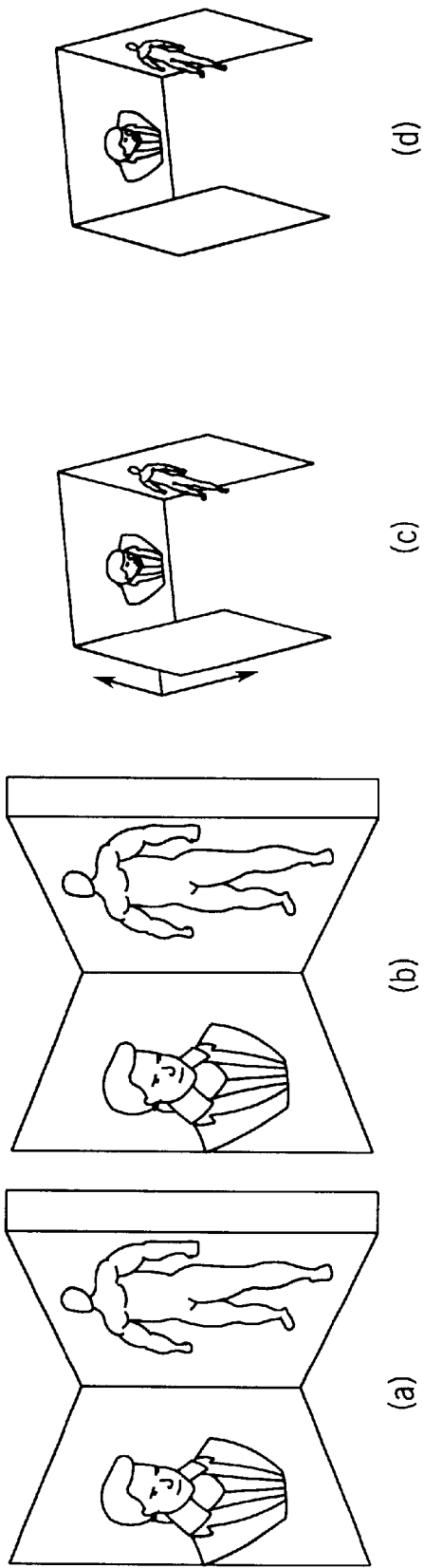

shape ambiguity: (*a*) and (*b*) have no points in common—no hard points exists;

color ambiguity: (*c*) and (*d*) share a point that has a different color assignment in the two scenes;

(*e*) shows the voxel coloring produced from the two images in (*a–d*);

these six points have the same color in every consistent scene that contains them;

FIG. 3 shows the reconstruction of a dinosaur toy:

(*a*) shows one of 21 input images taken from slightly above the toy while it was rotated 360°;

(*b*) and (*c*) show two views rendered from the reconstruction;

FIG. 4 shows the reconstruction of a synthetic room scene:

(*a*) shows the voxel coloring;

(*b*) shows the original model from a new viewpoint;

(*c*) shows the reconstruction from a new viewpoint outside the room;

(*d*) shows the original model from a new viewpoint outside the room.

2. VOXEL COLORING

This section describes the voxel coloring problem in detail. The main results require a visibility property that constrains the camera placement relative to the scene, but still permits the input cameras to be spread widely throughout the scene. The visibility property defines a fixed occlusion ordering, enabling scene reconstruction with a single pass through the voxels in the scene.

We assume that the scene is entirely composed of rigid Lambertian surfaces under fixed illumination. Under these conditions, the radiance at each point is isotropic and can therefore be described by a scalar value which we call color. We also use the term color to refer to the irradiance of an image pixel. The term's meaning should be clear by context.

2.1 Notation

A 3D scene S is represented as a finite set of opaque voxels (volume elements), each of which occupies a finite and homogeneous scene volume and has a fixed color. We denote the set of all voxels with the symbol V. An image is specified by the set I of all its pixels. For now, assume that pixels are infinitesimally small.

Given an image pixel p and scene S, we refer to the voxel $V \in S$ that is visible and projects to p by $V = S(p)$. The color of an image pixel $p \in I$ is given by color (p,I) and of a voxel V by color (V,S). A scene S is said to be complete with respect to a set of images if, for every image I and every pixel $p \in I$, there exists a voxel $V \in S$ such that $V = S(p)$. A complete scene is said to be consistent with a set of images if, for every image I and every pixel $p \in I$.

$$\text{color}(p,I) = \text{color}(S(p),S) \quad (1)$$

2.2 Camera Geometry

Figure 1:
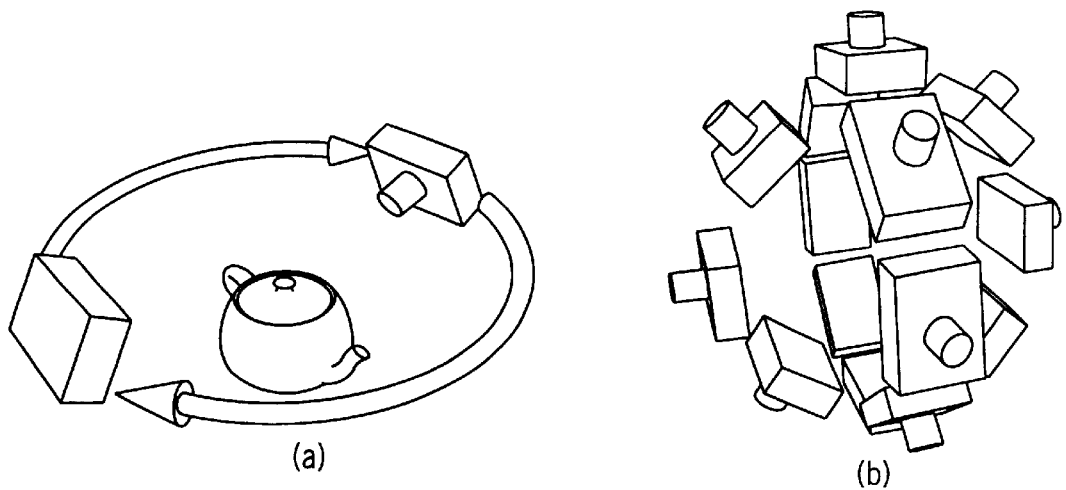
FIG. 1(a) and (b) show two camera geometries that satisfy the ordinal visibility constraint.

A pinhole perspective projection model is assumed, although the main results use a visibility assumption that applies equally to other camera models such as orthographic and aperture-based models. We require that the viewpoints (camera positions) are distributed so that ordinal visibility relations between scene points are preserved. That is, if scene point P occludes Q in one image, Q cannot occlude P in any other image. This is accomplished by ensuring that all viewpoints are "on the same side" of the object. For instance, suppose the viewpoints are distributed on a single plane, as shown in FIG. 1(*a*). For every such viewpoint, the relative visibility of any two points depends entirely on which point is closer to the plane. Because the visibility order is fixed for every viewpoint, we say that this range of viewpoints preserves ordinal visibility.

Planarity, however, is not required; the ordinal visibility constraint is satisfied for a relatively wide range of viewpoints, allowing significant flexibility in the image acquisition process. Observe that the constraint is violated only when there exist two scene points P and Q such that P occludes Q in one view while Q occludes P and Q lie on the line segment between the two camera centers. Therefore, a sufficient condition for the ordinal visibility constraint to be satisfied is that no scene point be contained within the convex hull C of the camera centers. For convenience, C will be referred to as the camera volume. We use the notation dist(V,C) to denote the distance of a voxel V to the camera volume. FIG. 1 shows two useful camera geometries that satisfy this constraint, one a downward facing camera moved 360 degrees around an object, and the other outward facing cameras on a sphere.

2.3 Color Invariance

It is well known that a set of images can be consistent with more than one rigid scene. Determining a scene's spatial occupancy is therefore an ill-posed task because a voxel contained in one consistent scene may not be contained in another (FIG. 2(*a,b*)). Alternatively, a voxel may be part of two consistent scenes, but have different colors in each (FIG. 2(*c,d*)).

Given a multiplicity of solutions to the reconstruction problem, the only way to recover intrinsic scene information is through invariants—properties that are satisfied by every consistent scene. For instance, consider the set of voxels that are present in every consistent scene. Laurentini [Laurentini, 1995] described how these invariants, called hard points, could be recovered by volume intersection from binary images. Hard points are useful in that they provide absolute information about the true scene. However, such points can be difficult to come by: some images may yield none (e.g., FIG. 2). In this section we describe a more frequently occurring type of invariant relating to color rather than shape.

A voxel V is a color invariant with respect to a set of images if, for every pair of scenes S and S' consistent with the images, $V \in S, S'$ implies color(V,S)=color(V,S')

Unlike shape invariance, color invariance does not require that a point be present in every consistent scene. As a result, color invariants tend to be more common than hard points. In particular, any set of images satisfying the ordinal visibility constraint yields enough color invariants to form a complete scene reconstruction, as will be shown.

Let $I_1, \ldots, I_m$ be set of images. For a given image point $p \in I_j$ define $V_p$ to be the voxel in $\{S(p) | S \text{ consistent}\}$ that is closest to the camera volume. We claim that $V_p$ is a color invariant. To establish this, observe that $V_p \in S$ implies $V_p = S(p)$, for if $V_p \neq S(p)$ S(p) must be closer to the camera volume, which is impossible by the construction of $V_p$. It then follows from Eq. (1) that $V_p$ has the same color in every consistent scene; $V_p$ is a color invariant.

The voxel coloring of an image set $I_1, \ldots, I_m$ is defined to be:

$$\overline{S} = \{V_p | p \in I_i, 1 \leq i \leq m\}$$

Figure 2:
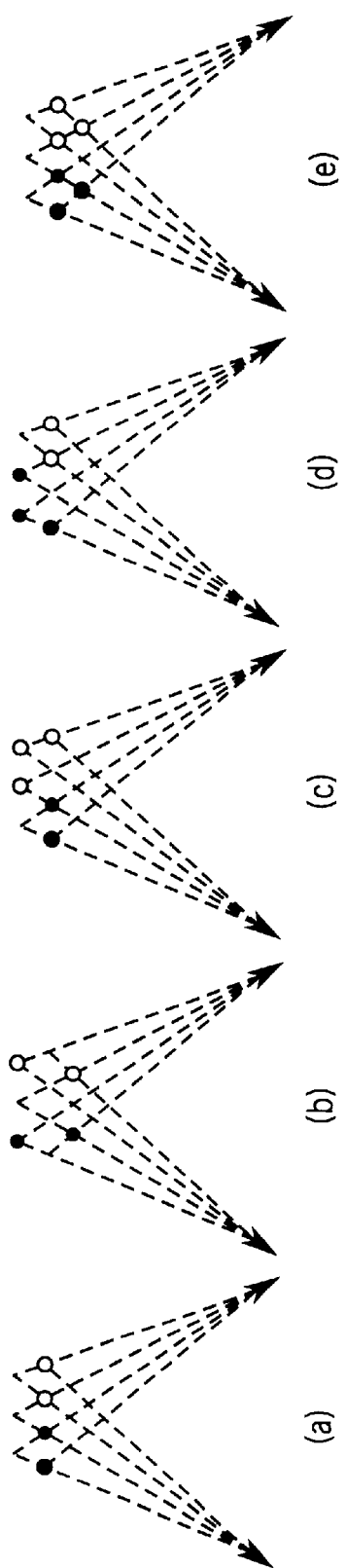
FIG. 2 (a–d) show four scenes that are indistinguishable from these two viewpoints.

FIG. 2(*e*) shows the voxel coloring resulting from a pair of views. These six points have a unique color interpretation, constant in every consistent scene. They also comprise the closest consistent scene to the cameras in the following sense—every point in each consistent scene is either included in the voxel coloring or is fully occluded by points in the voxel coloring. An interesting consequence of this closeness bias is that neighboring image pixels of the same color produce cusps in the voxel coloring, i.e., protrusions toward the camera volume. This phenomenon is clearing shown in FIG. 2(e) where the white and black points form two separate cusps. Also, observe that the voxel coloring is not a minimal reconstruction; removing the two closest points in FIG. 2(e) still leaves a consistent scene.

2.4 Computing the Voxel Coloring

In this section we describe how to compute the voxel coloring from a set of images. In addition it will be shown that the set of voxels contained in a voxel coloring form a scene reconstruction that is consistent with the input images.

The voxel coloring is computed one voxel at a time in an order that ensures agreement with the images at each step, guaranteeing that all reconstructed voxels satisfy Eq. (1). To demonstrate that voxel colorings form consistent scenes, we also have to show that they are complete, i.e., they account for every image pixel as defined in Section 2.1.

In order to make sure that the construction is incrementally consistent, i.e., agrees with the images at each step, we need to introduce a weaker form of consistency that applies to incomplete voxel sets. Accordingly, we say that a set of points with color assignments is voxel-consistent if its projection agrees fully with the subset of every input image that it overlaps. More formally, a set S is said to be voxel-consistent with images $I_1 \ldots I_m$ if for every voxel $V \in S$ and image pixels $p \in I_i$ and $q \in I_j$, $V=S(p)=S(q)$ implies color $(p,I_i)=$color $(q,I_j)$. For notational convenience, define $S_V$ to be the set of all voxels in S that are closer than V to the camera volume. Scene consistency and voxel consistency are related by the following properties:

1. If S is a consistent scene then $\{V\} \cup S_V$ is a voxel-consistent set for every $V \in S$.
2. Suppose S is complete and, for each point $V \in S$, $V \cup S_V$ is voxel-consistent. Then S is a consistent scene.

A consistent scene may be created using the second property by incrementally moving further from the camera volume and adding voxels to the current set that maintain voxel-consistency. To formalize this idea, we define the following partition of 3D space into voxel layers of uniform distance from the camera volume:

$$V_C^d = \{V | dist(V,C) = d\} \quad (2)$$

$$V = \bigcup_{i=1}^{r} V_C^{d_1} \quad (3)$$

where $d_1, \ldots d_r$ is an increasing sequence of numbers.

The voxel coloring is computed inductively as follows:
$SP_1 = \{V | V \in V_{d_1}, \{V\} \text{ voxel-consistent}\}$
$SP_k = \{V | V \in V_{d_1}, \{V\} \cup sp_{k-1} \text{ voxel-consistent}\}$
$SP = \{V | = SP_r(p) \text{ for some pixel } p\}$

We claim $SP = \overline{S}$. To prove this, first define $\overline{S}_i = \{V | V \in \overline{S}, dist(V,C) \leq d_i\}$. $\overline{S}_1 \subseteq SP_1$ by the first consistency property. Inductively, assume that $\overline{S}_{k-1} \subseteq SP_{k-1}$ and let $V \in \overline{S}_k$. By the first consistency property, $\{V\} \cup \overline{S}_{k-1}$ is voxel-consistent, implying that $\{V\} \cup SP_{k-1}$ is also voxel-consistent, because the second set includes the first and $SP_{k-1}$ is itself voxel-consistent. It follows that $\overline{S} \subseteq SP_r$. Note also that $SP_r$ is complete, since one of its subsets is complete, and hence consistent by the second consistency property. SP contains all the voxels in $SP_r$ that are visible in any image, and is therefore consistent as well. Therefore SP is a consistent scene such that each pixel p, SP(p) is at least as close as C as $\overline{S}(p)$. Hence $SP=\overline{S}$.

In summary, the following properties of voxel colorings have been shown:
$\overline{S}$ is a consistent scene
Every voxel in $\overline{S}$ is a color invariant
$\overline{S}$ is directly computable from any set of images satisfying the ordinal visibility constraint.

3. RECONSTRUCTION BY VOXEL COLORING

In this section we present a voxel coloring algorithm for reconstructing a scene from a set of calibrated images. The algorithm closely follows the voxel coloring construction outlined in Section 2. adapted to account for image quantization and noise. As before, it is assumed that 3D space has been partitioned into a series of voxel layers $V_C^{d_1}, \ldots V_C^{d_r}$ increasing in distance from the camera volume. The images $I_1 \ldots I_m$ are assumed to be quantized into finite non-overlapping pixels. The cameras are assumed to satisfy the ordinal visibility constraint, i.e., no scene point lies within the camera volume.

If a voxel V is not fully occluded in image $I_j$, its projection will overlap a nonempty set of image pixels, $\pi_j$. Without noise or quantization effects, a consistent voxel should project to a set of pixels with equal color values. In the presence of these effects, we evaluate the correlation of the pixel colors to measure the likelihood of voxel consistency. Let s be the standard deviation and n the cardinality of $$\bigcup_{j=1}^{m} \pi_j.$$

Suppose the sensor error (accuracy of irradiance measurement) is approximately normally distributed with standard deviation $\sigma_0$. If $\sigma_0$ is unknown, it can be estimated by imaging a homogeneous surface and computing the standard deviation of image pixels. The consistency of a voxel can be estimated using the following likelihood ratio test, distributed as $\chi^2$:

$$\lambda_v = \frac{(n-1)s}{\sigma_0}$$

3.1 Voxel Coloring Algorithm

The algorithm is as follows:

$S = \emptyset$ for $i = 1, \ldots, r$ do for every $v \in V_C^{d_1}$ do project to $I_1, \ldots, I_m$, compute $\lambda_v$ if $\lambda_v <$ thresh then $S = S \cup \{V\}$ The threshold, thresh, corresponds to the maximum allowable correlation error. An overly conservative (small) value of thresh results in an accurate but incomplete reconstruction. On the other hand, a large threshold yields a more complete reconstruction, but one that includes some erroneous voxels. In practice, thresh should be chosen according to the desired characteristics of the reconstructed model, in terms of accuracy vs. completeness.

The problem of detecting occlusions is greatly simplified by the scene traversal ordering used int he algorithm; the order is such that if V occludes V' then V is visited by V'. Therefore, occlusions can be detected by using a one-bit Z-buffer for each image. The Z-buffer is initialized to 0. When a voxel V is processed, $\pi_1$ is the set of pixels that overlap V's projection in $I_i$ and have Z-buffer values of 0. Once $\lambda_V$ is calculated, these pixels are then marked with Z-buffer values of 1.

3.2 Discussion

The algorithm visits each voxel exactly once and projects it into every image. Therefore, the time complexity of voxel coloring is: O(voxels*images). To determine the space complexity, observe that evaluating one voxel does not require access to or comparison with other voxels. Consequently, voxels need not be stored during the algorithm; the voxels making up the voxel coloring with simply be output one at a time. Only the images and one-bit Z-buffers need to be stored. The fact that the complexity of voxel coloring is linear in the number of images is essential in that it enables large sets of images to be processed at once.

The algorithm is unusual in that it does not perform any window-based image matching in the reconstruction process. Correspondence are found implicitly during the course of scene traversal. A disadvantage of this searchless strategy is that it requires very precise camera calibration to achieve the triangulation accuracy of existing stereo methods. Accuracy also depends on the voxel resolution.

Importantly, the approach reconstructs only one of the potentially numerous scenes consistent with the input images. Consequently, it is susceptible to aperture problems caused by image regions of near-uniform color. These regions will produce cusps in the reconstruction (see FIG. 2(e)) since voxel coloring seeks the reconstruction closest to the camera volume. This is a bias, just like smoothness in a bias in stereo methods, but one that guarantees a consistent reconstruction even with severe occlusions.

4. EXPERIMENTAL RESULTS

The first experiment involved reconstructing a dinosaur toy from 21 views spanning a 360-degree rotation of the toy. FIG. 3 shows the voxel coloring computed. To facilitate reconstruction, we used a black background and eliminated most of the background points by the thresholding the images. While background substraction is not strictly necessary, leaving this step out results in background-colored voxels scattered around the edges of the scene volume. The threshold may be chosen conservatively since removing most of the background pixels is sufficient to eliminate this background scattering effect. FIG. 3(b) shows the reconstruction from approximately the same viewpoint as (a) to demonstrate the photo integrity of the reconstruction. FIG. 3(c) shows another view of the reconstructed model. Note that fine details such as the wind-up rod and hand shape were accurately reconstructed. The reconstructed contained 32.244 voxels and took 45 seconds to compute.

A second experiment involved reconstructing a synthetic room from views inside the room. The room interior was highly concave, making accurate reconstruction by volume intersection or other counter-based methods impractical. FIG. 4 compares the original and reconstructed models from new viewpoints. New views were generated from the room interior quite accurately, as shown in (a), although some details were lost. For instance, the reconstructed walls were not perfectly planar. This point drift effect is most noticeable in regions where the texture is locally homogeneous, indicating that texture information is important for accurate reconstruction. The reconstruction contained 52,670 voxels and took 95 second to compute.

5. CONCLUDING REMARKS

This paper presented a new scene reconstruction technique that incorporates intrinsic color and texture information for the acquisition of photorealistic scene models. Unlike existing stereo and structure-from-motion techniques, the method guarantees that a consistent reconstruction is found, even under severe visibility changes, subject to a weak constraint on the camera geometry. A second contribution was the constructive proof of the existence of a set of color invariants. These points are useful in two ways: first, they provide information that is intrinsic, i.e., constant across all possible consistent scenes. Second, together they constitute a volumetric spatial reconstruction of the scene whose projections exactly match the input images.

We claim:

1. A method of generating a photorealistic three-dimensional model of a three dimensional environment each compose of voxels, the method comprising the steps of:

(a) collecting at least two images of pixels, the pixels representing projections of the three dimensional environment along rays from a known viewpoint and be a known orientation with respect to the environment;

(b) processing the images with an electronic computer communicating with a memory, the memory storing the three-dimensional model and holding a program executed by the computer to:

(i) identify a voxel in a first surface of the environment toward the viewpoints in the model;

(ii) reviewing the images to collect pixels associated with rays intersecting the voxel in the environment not blocked by a previously modeled voxel;

(iii) only if colors of the collected pixels match according to a predetermined criterion, adding the voxel to the model; and (iv) repeat steps (i) to (iii) for all voxels in the environment in progressive surfaces moving away from the viewpoints.

* * * * *